(12) United States Patent
Fukushima et al.

(10) Patent No.: US 6,981,205 B2
(45) Date of Patent: Dec. 27, 2005

(54) DATA STORAGE APPARATUS, READ DATA PROCESSOR, AND READ DATA PROCESSING METHOD

(75) Inventors: Yukio Fukushima, Tokyo (JP); Katsuhiko Katoh, Fujisawa (JP); Shunsuke Kobayashi, Machida (JP); Takashi Kuroda, Chigasaki (JP); Yuzo Nakagawa, Hiratsuka (JP); Fuminori Sai, Yokohama (JP); Emi Shimono, Yamato (JP); Tetsuya Tamura, Yamato (JP); Tetsuo Ueda, Sagamihara (JP)

(73) Assignee: Lenovo (Singapore) PTE LTD, (SG)

( * ) Notice: Subject to any disclaimer, the term of this patent is extended or adjusted under 35 U.S.C. 154(b) by 554 days.

(21) Appl. No.: 10/279,305

(22) Filed: Oct. 23, 2002

(65) Prior Publication Data

US 2003/0112669 A1 Jun. 19, 2003

(30) Foreign Application Priority Data

Oct. 23, 2001 (JP) .............................. 2001-325696

(51) Int. Cl.⁷ ............................................ G06F 11/08
(52) U.S. Cl. .................... 714/797; 714/764; 714/769
(58) Field of Search ................................ 714/769, 797, 714/763, 764; 360/53, 47.34, 13.05

(56) References Cited

U.S. PATENT DOCUMENTS

| | | | | |
|---|---|---|---|---|
| 4,564,945 | A | * | 1/1986 | Glover et al. ................ 714/769 |
| 6,141,164 | A | * | 10/2000 | Ishibashi et al. .............. 360/53 |
| 6,606,210 | B1 | * | 8/2003 | Coker et al. .................. 360/53 |
| 6,625,096 | B1 | * | 9/2003 | Arai ........................ 369/47.34 |
| 6,687,194 | B1 | * | 2/2004 | Kobayashi et al. ...... 369/13.05 |

FOREIGN PATENT DOCUMENTS

| | | | |
|---|---|---|---|
| JP | PUPA 54-087514 | 7/1979 | ............ G11B 5/09 |
| JP | PUPA 63-204924 | 8/1998 | .......... H03M 12/00 |
| JP | PUPA 2001-056769 | 2/2001 | ............ G06F 11/14 |

* cited by examiner

*Primary Examiner*—David Ton
(74) *Attorney, Agent, or Firm*—Scott W. Reid

(57) ABSTRACT

To improve the probability of error correction, thereby generating correct read data. Data is read from the same sector by a number of times and a majority decision is done in the same address, thereby the most frequently read value is regarded as the true data value in the address. For example, for an address 00, "00" is handled as a true data value.

23 Claims, 10 Drawing Sheets

100 : 0000000000000000 0000000000000000 0000000000000000 0000000000000000
120 : 0000000000000000 0000000000000000 0000000000000000 0000000000000000
140 : 0000000000000000 0000000000000000 0000000000000000 0000000000000000
160 : 0000000000000000 0000000000000000 0000000000000000 0000000000000000
180 : 0000000000000000 0000ACDB3436FD1D 12AFB6A32698DD53 6753A792BB210000
1A0 : 0000000000000000 0000000000000000 0000000000000000 0000000000000000
1C0 : 0000000000000000 0000000000000000 0000000000000000 0000000000000000
1E0 : 0000000000000000 0000000000000000 0000000000000000 0000000000000000
```

100 :  0000000000000000  0000000000000000  0000000000000000  0000000000000000
120 :  0000000000000000  0000000000000000  0000000000000000  0000000000000000
140 :  0000000000000000  0000000000000000  0000000000000000  0000000000000000
160 :  0000000000000000  0000000000000000  0000000000000000  0000000000000000
180 :  0000000000000000  00328F992B5A1617  728E771B3C265FA7  24729DEC36890000
1A0 :  0000000000000000  0000000000000000  0000000000000000  0000000000000000
1C0 :  0000000000000000  0000000000000000  0000000000000000  0000000000000000
1E0 :  0000000000000000  0000000000000000  0000000000000000  0000000000000000
```

[Figure 7]

| Address | 00 01 02 03 04 05 06 07 08 09 | ... | F9 FA FB FC FD FE FF |
|---|---|---|---|
| WT data | 00 00 00 00 00 00 00 00 00 00 | ... | 00 00 00 00 00 00 00 |
| Read |  |  |  |
| 1 : | 00 00 cb 00 55 11 00 00 00 00 | ... | 00 00 22 00 77 00 00 |
| 2 : | fb 11 e3 78 9a c1 a0 99 00 00 | ... | 23 32 c1 15 bc 67 21 |
| 3 : | 00 55 00 00 00 00 00 00 22 33 | ... | 00 aa 00 28 00 9a 00 |
| 4 : | 34 00 62 00 11 00 27 00 56 00 | ... | 00 00 34 00 00 00 23 |
| 5 : | 00 00 00 00 31 00 00 53 00 00 | ... | 00 00 00 00 00 00 00 |
| Data resulting from majority decision : | 00 00 00 00 xx 00 00 00 00 00 | ... | 00 00 00 00 00 00 00 |

→ Erasure correction 00 00 00 00 00 00 00 00 00 00 ... 00 00 00 00 00 00 00

[Figure 8]

```
15byte error
        0   2   4   6    8   A   C   E    0   2   4   6    8   A   C   E
000 : 0000000000C00000 00001010000000000 0000000000000000 0000000000000000
020 : 000000000007CC0 0600000000000000 0000000000000000 0000000000000001
040 : 80000000C000CC00 0000000000000000 0000000000000000 0000000000000000
060 : 0000000000000000 0000000000000000 0000000000000000 0000000000000000
080 : 0000000000000000 0000000000000000 0000000000000000 0000000000000000
0A0 : 0000000000000000 0000000000000000 0000000000000000 0000000000000000
0C0 : 0000000000000000 00000000000000C0 0000000300000000 0000000000000000
0E0 : 0000000000000000 0000000000000000 0000000000000000 0000000000000000

```
17byte error
        0   2   4   6    8   A   C   E    0   2   4   6    8   A   C   E
000 : 0000000000000000 0000000000000000 0000000000000000 0000000000000000
020 : 0000000000000000 0000000000000000 0000000000000000 0000000000000000
040 : 0000000000000000 0000000000000000 0000000000000000 0000000000000000
060 : 00BB000000000046 0000220000000000 0000000000000000 0000000000000000
080 : 0000000000000000 0000000000000000 0000000000000000 0000000000000000
0A0 : 0000000000000000 0000000000000000 0000000000000000 0000000000000000
0C0 : 0000000000000000 0000000000000000 0000000000000000 0000000000000000
0E0 : 00D5000000000000 0000000000000000 0000000000000000 0000000000000000

100 : 0000000000000000 0000000000000000 0000000000000000 0000000000000000
120 : 0000000000000000 0000000000000000 0000000000000000 0000000000690000
140 : ADC0000000000000 0000000000000000 0000000000000000 0000000000000000
160 : 0000000000000000 0000000000000000 0000000000000000 0000000000000000
180 : 0000000000000000 000000000000D400 00000000000000C0 0000000000000000
1A0 : 0000966B00000000 0000000000000000 0000000000000000 000000000006A000
1C0 : ADA6000028000000 0000000000000000 0000000000000000 000000011B000000
1E0 : 0000000000000000 0000000000000000 0000000000000000 0000000000000000
```

[Figure 10]

```
11byte error
         0   2   4   6     8   A   C   E     0   2   4   6     8   A   C   E
000 : 0000000000000000  00000000000000C0  0000000C00000000  0000000000000000
020 : 0000000000000000  0000000000000000  0000000000000000  0000000000003000
040 : 00000000C0008000  000000000000F97F  0000000000000000  0000000000000000
060 : 0000000000000000  0000000000000000  0000000000000000  0000000000000000
080 : 0000000000000000  0000000000000000  0000000000000000  0000000000000000
0A0 : 0000000000000000  0000000000000000  0000000000000000  0000000000000000
0C0 : 0000000000000000  0000000000000000  0000000000000000  0000000000000000
0E0 : 0000000000000000  0000000000000000  0000000000000000  0000000000000000

```
6byte error
         0   2   4   6     8   A   C   E     0   2   4   6     8   A   C   E
000 : 0000000000000000  0000000000000000  0000000000000000  0000000000000000
020 : 0000000000000000  0000000000000000  0000000000000000  0000000000003000
040 : 0000000000006000  0000000000000000  0000000000000000  0000000000000000
060 : 0000000000000000  0000000000000000  0000000000000000  0000000000000000
080 : 0000000000000000  0000000000000000  0000000000000000  0000000000000000
0A0 : 0000000000000000  0000000000000000  0000000000000000  0000000000000000
0C0 : 0000000000000000  00000000000000C0  0000000300000000  0000000000000000
0E0 : 0000000000000000  0000000000000000  0000000000000000  0000000000000000

```
8byte error
        0   2   4   6     8   A   C   E     0   2   4   6     8   A   C   E
000 : 0000000000000000  0000000000000000  0000000000000000  0000000000000000
020 : 0000000000000000  0000000000000000  0000000000000000  0000000000000001
040 : 8000000000006000  0000000000000000  0000000000000000  0000000000000000
060 : 0000000000000000  00000000A3000000  0000000394000000  0000000000000000
080 : 0000000000000000  0000000000000000  0000000000000000  0000000000000000
0A0 : 0000000000000000  0000000000000000  0000000000000000  0000000000000000
0C0 : 0000000000000000  0000000000000000  0000000000000000  0000000000000000
0E0 : 0000000000000000  0000000000000000  0000000000000000  0000000000000000

```
2byte error
        0   2   4   6     8   A   C   E     0   2   4   6     8   A   C   E
000 : 0000000000000000  0000000000000000  0000000000000000  0000000000000000
020 : 0000000000000000  0000000000000000  0000000000000000  0000000000000000
040 : 0000000000006000  0000000000000000  0000000000000000  0000000000000000
060 : 0000000000000000  0000000000000000  0000000000000000  0000000000000000
080 : 0000000000000000  0000000000000000  0000000000000000  0000000000000000
0A0 : 0000000000000000  0000000000000000  0000000000000000  0000000000000000
0C0 : 0000000000000000  0000000000000000  0000000000000000  0000000000000000
0E0 : 0000000000000000  0000000000000000  0000000000000000  0000000000000000

DATA STORAGE APPARATUS, READ DATA PROCESSOR, AND READ DATA PROCESSING METHOD

BACKGROUND OF THE INVENTION

1. Field of the Invention

The present invention relates to a data storage apparatus as a hard disk drive. More particularly, the present invention relates to a method for deciding whether or not an error has occurred in each data read from a data storage medium and further a method employed for error data correction.

2. Background Art

A hard disk drive is one of the most popular external storage apparatuses employed for computers. As known well, a magnetic disk, which is a storage medium of such a hard disk drive, consists of sectors (the minimum unit of recording) formed by radially partitioning tracks on the surface of the disk. The tracks are formed by dividing the surface of the disk just like the growth rings. The line recording density of such the magnetic disk can be increased as closing to the outer periphery. This is why the "zoned bit recording" method, which is the present mainstream of data recording methods of magnetic disks, divides every track into some zones and fixes the line recording density in each of those zones. Consequently, the closer the track comes to the periphery of the magnetic disk, the more the number of sectors in the track increases, since the sector length is usually fixed at 512 bytes.

A hard disk drive is provided with a head used to read/write data from/on its magnetic disk. This head is attached to an actuator mechanism driven by a VCM (Voice Coil Motor).

When the head is to read/write data from/on the magnetic disk, the actuator mechanism is driven, thereby the head moves to a predetermined track so as to be positioned there. The head movement to a predetermined position is controlled according to the servo information stored on the magnetic disk.

In such a hard disk drive, the recording density per unit area increases significantly then the signal processing system S/N ratio lowers, thereby the existence of magnetic defects on the magnetic disk comes not to be negligible. This is why error correction becomes a very important factor to improve the reliability of data in that the data can be read/written even when a magnetic disk has such defects.

Error correction is executed, for example, for read data that contains an error. The read data errors are usually caused by peeling of the magnetic layer from the subject magnetic disk, scratches on the magnetic disk formed by rubbing against the magnetic head, dust and foreign matters stuck on the magnetic disk, etc. A hard disk drive enables a few tens of bytes of parity data to be added to each sector (usually, 512 bytes) of data on the magnetic disk so as to be used for such the error correction. This parity data is referred to as the ECC (Error Correcting Code). When reading, a syndrome is generated from the data read by the ECC circuit located in the subject hard disk drive and the read parity (ECC). This syndrome is used to detect each error location and correct the error.

For example, the four-way interleaving is taken here as an example of such the error correction for data divided in units of 512 bytes/sector. The four-way interleaving means a method that divides a sector of data into four sections (interleave sections) sequentially from start to end and finds the parity in each interleaved data. In this case, when the addition of ECC byte is performed with 12 bytes per interleave section, that is, 48 bytes per sector, 5-byte errors per interleave section, that is, 20-byte errors per sector can be corrected. Consequently, when the number of error-occurrence bytes in reproduced data is within the predetermined capacity, error correction can be continued without stopping the data transfer while the data is read sequentially. This operation is referred to as OTF (On The Fly Collection).

When the number of error-occurred bytes exceeds the error correcting capacity, however, the MPU and/or the HDC (Hard Disk Controller) of the hard disk drive retries reading by changing the read parameters such as the offset in the track width direction of the read head, the coefficient of the channel equalizer, etc. This is referred to as an error recovery operation. And, when an error cannot be corrected even with this error recovery operation, if the error location is identified by any means, more error bytes can be corrected than in the error correction by the OTF. This operation is referred to as "erasure correction." Conventionally, each error location has been detected with use of error location information obtained according to a parity error signal, etc. received from a read/write channel Viterbi Decoder as disclosed, for example, in Published Unexamined Patent Application No. 2000-57707.

However, the above conventional method has often been confronted with problems. For example, error locations are found excessively due to the variation of such characteristics as the soft error rate, etc. among respective heads. Especially, when random noise is a factor of an uncorrectable error, the error location might be varied each time the data is read therefrom. In addition, the accuracy of the viterbi decoder to find error locations has often become unstable. This has also been a problem. This is why the error correction probability has not been so high when the error correction capacity is exceeded as described above.

SUMMARY OF THE INVENTION

The present invention advantageously provides a method for improving the error correcting probability to generate correct read data.

As described above, when random noise is a factor of an uncorrectable error, the error occurrence location is varied at each time of readout. However, this characteristic can also be used to identify the error location. Specifically, if a piece of data is read from the same sector several times, compared with each another, and all the pieces of read data match with one another through a number of attemps of reading, then the pieces of data in the sector can be decided as true data containing no error. On the contrary, if the pieces of read data do not match with one another, the pieces of data in the sector is decided as error data. For example, if "0" is kept as the data value at a predetermined location in the same sector through a number of attempts of reading from a hard disk drive, the data in that predetermined location is regarded as true data. On the contrary, if the data value at such a predetermined location is "1" at the first attempt of reading, then "0" at the second attemps of reading, the data in that predetermined location is regarded as error data.

The data storage apparatus of the present invention has been achieved on the basis of such the conception. The data storage apparatus comprises a head that writes/reads data in response to a write/read request received from a host; a storage medium on/from which write/read data is stored/read by the write/read processing of the head; storage means that temporarily stores pieces of read data read by the head several times from a predetermined area on the storage medium, individually; and comparing means that compares each read data with others.

Because the data storage apparatus of the present invention can compare the pieces of read data with each other, it is possible to decide whether or not an error occurs in the pieces of read data being compared.

In the data storage apparatus of the present invention, the comparing means can decide matching/unmatching among data values in corresponding sections of the read data stored individually. When the data values do not match with each other, the data values can be regarded as an error. On the other hand, when the data values match with each other, the data values contain no error. The data can thus be handled as true data.

According to the data storage apparatus of the present invention, an error location can be identified accurately by making a comparison among the pieces of read data. When the data storage apparatus is provided with error correcting means that corrects the error in each section decided as unmatching by the comparing means, it is possible to output a piece of read data with extremely high accuracy.

In the data storage apparatus of the present invention, when read data are compared to identify the true piece of data, it is preferable that the read process is performed more than three times to provide higher accuracy. In this case, it may take a majority decision for the data values in corresponding sections of the pieces of the read data stored individually. The comparing means can regard the most frequently read value resulting from the majority decision as the true data value in the section and generate a piece of read data by combining such data values. On the contrary, pieces of read data other than the piece of data decided as true are all regarded as error data to be subjected to an error correction process.

The present invention also provides the following read data processor to be employed for the above data storage apparatus.

This read data processor is provided with first deciding means that decides whether or not a data error occurs in a first piece of data read from each sector having a predetermined capacity; reread instructing means that obtains a second piece of data by reading the same data again from a sector containing the first piece of data decided as error data by the first deciding means; second deciding means that decides whether or not the first and second piece of data values in the same location are different from each other; and error correcting means that corrects the first and second piece of data whose values are decided as different by the second deciding means.

The read data processor of the present invention identifies error data by deciding that the values are different between the first and second pieces of data in a corresponding position. This identified piece of error data is subjected to an error correction process. Consequently, the error correction probability can be improved.

In the read data processor of the present invention, it is not always required to decide whether or not the values are different between the first and second pieces of read data in corresponding positions. When no error occurs, such the decision is almost unnecessary. Consequently, the second deciding means should preferably decide whether or not the first and second data values are different only when the second data is decided as error data by the first deciding means.

The present invention also provides the following read data processor that processes data read from each sector on a recording medium having a track consisting of a plurality of sectors. This read data processor is provided with storage means that temporarily stores n pieces of read data read by n times (n; natural number) from a predetermined sector; identifying means that identifies the most frequently read value in each location of the sector over the n pieces of data; and read data composing means that composes a generated piece of data generated by the most frequently read values identified in locations by the identifying means.

The above read data processor regards the most frequently read value identified in each location as true data and it can apply such processes as error correction to other (not true) data to output the data as true data.

In the read data processor of the present invention, it is sometimes impossible to identify the most frequently read values among those of n pieces of data read from each location in a sector. In this case, a data value latest read in a predetermined number of readings, for example, the first read data value can be specified as a value for composing the generated piece of data in the location concerned and the piece of data can be subjected to the subsequent error correction process.

The read data processor of the present invention can be provided with error correcting means used for error correction of the generated piece of data composed by the read data composing means.

At present, data read from a magnetic disk in a hard disk drive is divided into the predetermined number of interleave section. Here, "the four-way interleaving" means encoding of the data values in four series of locations, with the locations in each series being spaced by three locations in-between, and with one of the series of locations being shifted from another by one location. For example, when values of user data in one sector is written like 00 01 02 03 04 05 06 ... 511, 00, 04, 08, ... are written in the interleaved 0, 01, 05, 09, ... are written in the interleave section 1, 02, 06, 10, ... are written in the interleave section 2, and 03, 07, 11, ... are written in the interleave section 3.

Assume now that an error that cannot be corrected completely with an ECC (Error Correcting Code) occurs in a sector of data in the above interleave section. In this case, however, in the aspect of interleave section, the sector of data may have interleave sections that can be error-corrected by the ECC and interleave sections that cannot be error-corrected by the ECC. Therefore, it is possible to perform error correction for each interleave section and combine the error corrected interleave sections to allow reading of data that has been impossible.

The present invention also provides a data storage apparatus that employs the above conception. The data storage apparatus of the present invention is provided with a head that writes/reads data in response to a write/read request received from a host; a storage medium on/from which data is stored/read by the write/read processing of the head; first storage means that temporarily stores a piece of read data read from the storage medium by the head with the piece of read data in predetermined units divided and stored according to the predetermined rule; and deciding means that decides whether or not an error occurrs in the piece of read data divided and stored in each predetermined unit.

A data storage apparatus of the present invention is also provided with error correcting means for error correction for the read data divisions in said predetermined units, respectively, when the piece of read data is decided as error data. The deciding means, after each error correction is performed by the error correcting means, decides, with respect to the read data decided as error data, whether or not error correction has been allowed for each read data division stored in the predetermined unit error data.

Furthermore, the data storage apparatus of the present invention can be provided with second storage means that stores a predetermined unit of read data decided as error correctable by the deciding means and corrected by the error correcting means.

On the other hand, the data storage apparatus of the present invention applies a predetermined process for allowing error correction to each predetermined unit of data having the piece of read data decided as error uncorrectable by the deciding means. This predetermined error correction process includes an error recovery operation that retries reading of data by changing the read parameters such as an offset of the read head in the track width direction, a coefficient of a channel equalizer, etc.

The error correcting means performs an error correction process to the predetermined unit over which a predetermined process for error correction has been applied, and the predetermined unit of error corrected data is stored in the second storage means.

The data storage apparatus of the present invention can also be provided with editing means that generates a predetermined unit of data to be output on the host according to the piece of read data decided as error correctable by the deciding means and corrected by the error correcting means and the piece of read data whose error is decided as uncorrectable by the deciding means and corrected by the error correcting means. Both of the data are read from the second storage means.

The present invention also provides a read data processor to be employed for the above data storage apparatus as follows. This processor divides a piece of data read from each sector on a storage medium into a number of interleave sections, thereby processing the piece of data. The processor has essentially a storage means that stores each interleave section of the piece of data; error deciding means that decides whether or not an error occurres in each interleave section; and error correcting means that applies an error correction process to each interleave section. This read data processor combines interleave sections decided as error occurred, interleave sections by the error deciding means and corrected by the error correcting means, so as to compose read data to be output to external.

While a description has been made for a data storage apparatus and a read data processor with respect to the identification of error data or the identification of true data, the present invention can also provide a read data processing method to be employed for the data storage apparatus and the read data processor.

The read data processing method of the present invention reads a piece of user data from each sector on a storage medium, decides whether or not an error occurs in the piece of read user data, and reads the piece of user data once or twice or more than twice from a sector that contains user data decided as error data. Then, the value of the piece of user data initially read and the value of the piece of read user data next read from the same location, are compared with each other.

In this comparison, it is decided whether or not the data value in the location is varied each time the data is read therefrom. When the data value is varied, the piece of data with varied value is decided as a cause of the error occurrence. On the other hand, when the piece of data value has no variation in the data value, the data is decided to contain no error. The read data processing method can also assume the most frequently matched data value as a true data value even when all the values read from the location are not identical.

The present invention also provides a read data processing method to be employed for the above data storage apparatus and the above read data processor related to interleaving.

The read data processing method of the present invention reads a piece of user data from each sector on a storage medium, dividing the read data into a number of interleave sections, decides whether or not an error of the piece of user data occurs in each interleave sections applies the first error correction process to each interleave section decided as error data, and applies the second error correction process to each interleave section whose error is not corrected by the first error correction process. The second error correction process differs from the first error correction process. In the case of this read data processing method, a sector of read data to be output to the host is composed of one or more than two of interleave sections such as interleave section decided as having no error, interleave sections whose detected error is corrected by the first error correction process, and interleave sections whose detected error is corrected by the second error correction process.

DETAILED DESCRIPTION OF THE PREFERRED EMBODIMENTS

Figure 1:
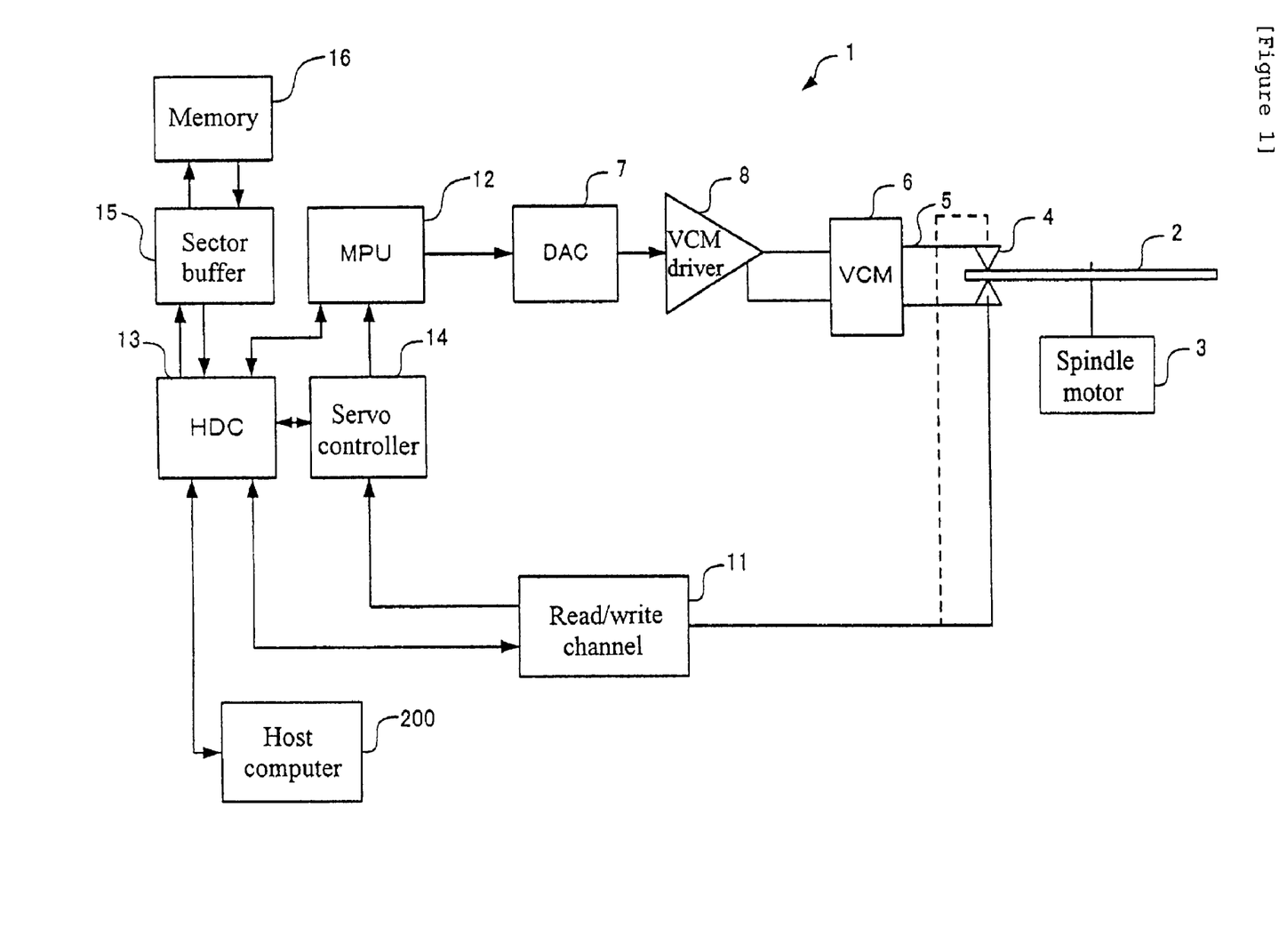
FIG. 1 is a block diagram of the major portion of a hard disk drive in an embodiment of the present invention.

Hereunder, the present invention will be described in detail with reference to an embodiment of the present invention. FIG. 1 shows a block diagram of the main unit of a hard disk drive 1 in the embodiment of the present invention. The hard disk drive 1 is a data recording/reproducing apparatus in which a head 4 seeks and stays at a predetermined track (position) to write/read data on/from a magnetic disk 2 driven rotationally by a spindle motor 3. In this embodiment, the magnetic disk 2 is assumed to be single while a plurality of disks 2 may be provided as needed.

The magnetic disk 2 is driven rotationally around the spindle shaft of the spindle motor 3 while the hard disk drive 1 is in operation. When the hard disk drive 1 is not in operation, the magnetic disk 2 does not rotate. On the surface of the magnetic disk 2 are formed a plurality of location information (servo information) storing fields in the radial direction of the magnetic disk 2. Data is stored in other fields. The head 4 reads such servo information to recognize its own position on the recording medium. The servo information consists of track identification data and a burst pattern. The track identification data denotes the track address of each data track. The head 4 reads this track identification information to decide the current head 4 positioned track. The burst pattern consists of signal stored fields arranged at fixed intervals in the radial direction of the magnetic disk 2. The burst pattern consists of a plurality of signal storing region trains with the signal storing region having phases different from each others. According to the signal output from this burst pattern, the head 4 can decide an offset from a target track.

The head 4 is composed of two head-sections, which are retained at the tip of an actuator 5 facing the front and back surfaces of the magnetic disk 2, respectively. The head 4 is used to write/read data on/from the magnetic disk 2. The head 4 also read the servo information recorded on the magnetic disk 2. The head 4 moves in the radial direction of the magnetic disk 2 together with the actuator 5. A ramp (not shown) for the head 4 to rest in when idle time is disposed outside the magnetic disk 2.

A read/write channel 11 is used to read/write data. Specifically, the read/write channel translates write data received from the host computer 200 via an HDC (Hard Disk Controller) 13 to write signals (current) to be supplied to the head 4. According to this write current, the head 4 writes data on the magnetic disk 2. On the other hand, the read/write channel 11 translates signals (current) from the magnetic disk 2 to digital data to be output to the host computer 200 via the HDC 13.

A servo controller 14 extracts servo information from the read data output from the read/write channel 11. As described above, the servo information includes track identification information and a burst pattern. The extracted servo information is transferred to an MPU (Micro Processing Unit) 12. The head 4 uses such servo information to determine an offset from the center of a target track. The offset is transferred to the HDC 13.

The actuator 5 is driven by a VCM (Voice Coil Motor) 6. Therefore, the VCM 6 can also drive the head 4. The VCM 6 is composed of a movable element that is a coil and a stator whose element is a permanent magnet. A predetermined current is supplied to this coil from the VCM driver 8, thereby the movable element is driven so that the head 4 moves to/stays at a predetermined position on the magnetic disk 2.

An HDC (Hard Disk Controller) 13 can function as an interface of the hard disk drive 1. One of the interface functions of the HDC 13 is used to receive write data received from the host computer 200 and transfer the received write data to a sector buffer 15.

The write data stored temporarily in the sector buffer 15 is read and transferred to the read/write channel 11 by the HDC 13 according to the command issued from the MPU 12. The HDC 13 also temporarily stores the read data received from the read/write channel 11 in the sector buffer 15, then transfers the data to the host computer 200. The HDC 13 can also correct read errors.

A memory 16 functions as a work area for processing data read from the sector buffer 15 in the characteristic way of this embodiment. This function will be described later in detail.

The MPU 12 and the HDC 13 work together to control the hard disk drive 1. The MPU 12 translates and executes programs stored in the memory 16. The MPU 12 decides the position of the head 4 according to the servo information received from the servo controller 14 and outputs a head positioning control current to a digital/analog converter (DAC) 7 according to a distance between the decided position of the head 4 and the target position.

The DAC 7 translates the positioning control current received from the MPU 12 to an analog signal (voltage signal) to be output to the VCM driver 8.

The VCM driver 8 translates the voltage signal received from the DAC 7 to a drive current to be supplied to the VCM 6.

Figure 2:
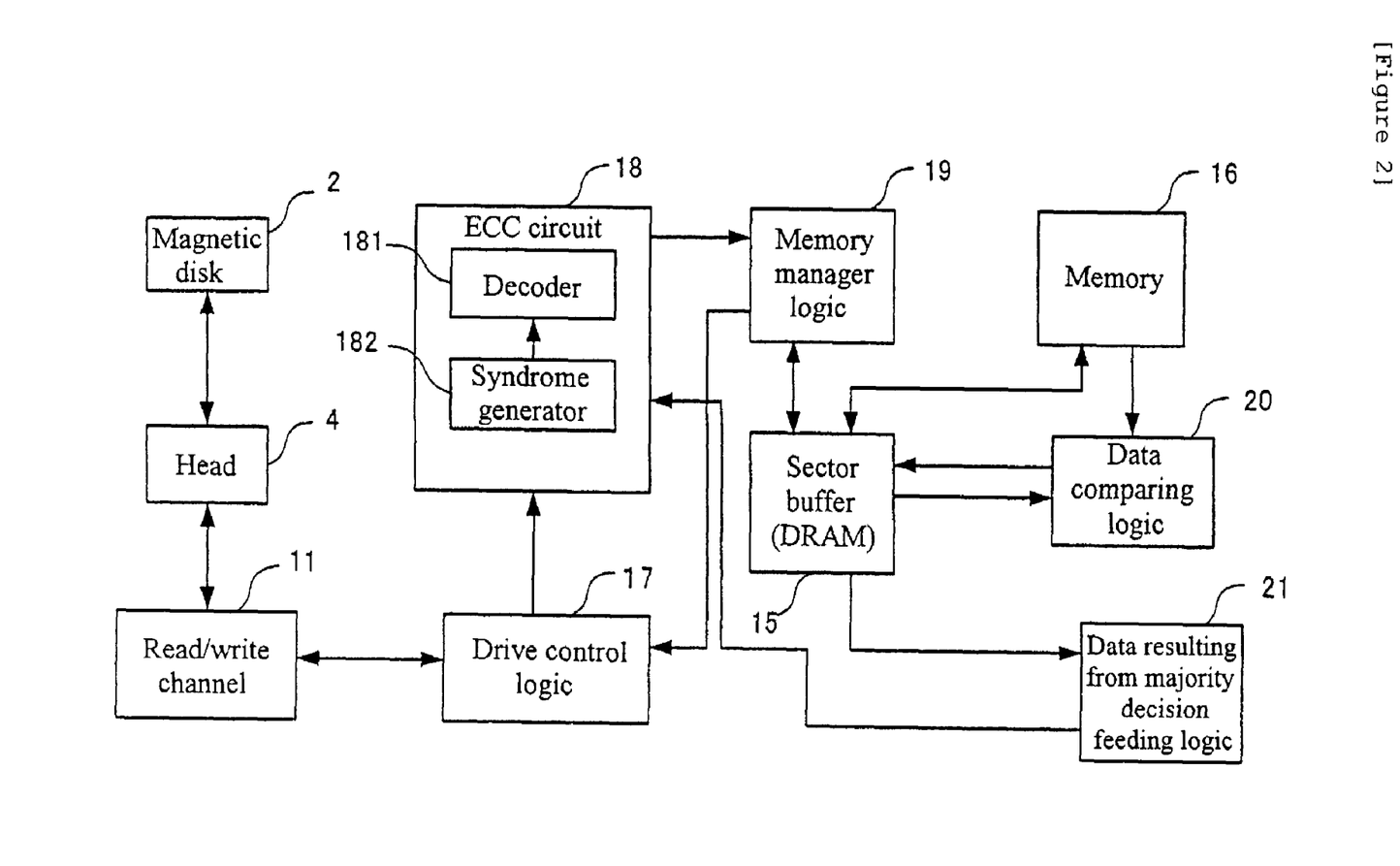
FIG. 2 is a functional block diagram of the hard disk drive that is to process read data.

FIG. 2 shows a functional block diagram of the hard disk drive 1 for processing read data.

In FIG. 2, the drive control logic 17 transfers the read data received from the read/write channel 11 to an ECC circuit 18.

The ECC circuit 18 detects and corrects an error according to the read data that includes an ECC. This error correction includes both of the OTF and the erasure correction described above. The decoder 181 and a syndrome generator 182 make both of the error decision and the error correction. Here, the syndrome is a value generated with a predetermined polynomial, which depends only on an error. In other words, when each data therein contains no error the predetermined polynomial generates null. A memory manager logic 19 controls the sector buffer 15 and the memory 16 that store read data respectively.

A data comparing logic 20 makes a comparison among a plurality of data read from the same location in the sector buffer 15/memory 16. This comparison includes decision of changes of data values, that is, decision of matching/unmatching among data values. The comparison can also accept a majority decision of data values read from the same location.

After accepting a majority decision, the data feed logic 21 feeds the data employed after the majority decision made by the data comparing logic 20' to the ECC circuit 18. This operation will be described later in detail.

Figure 3:
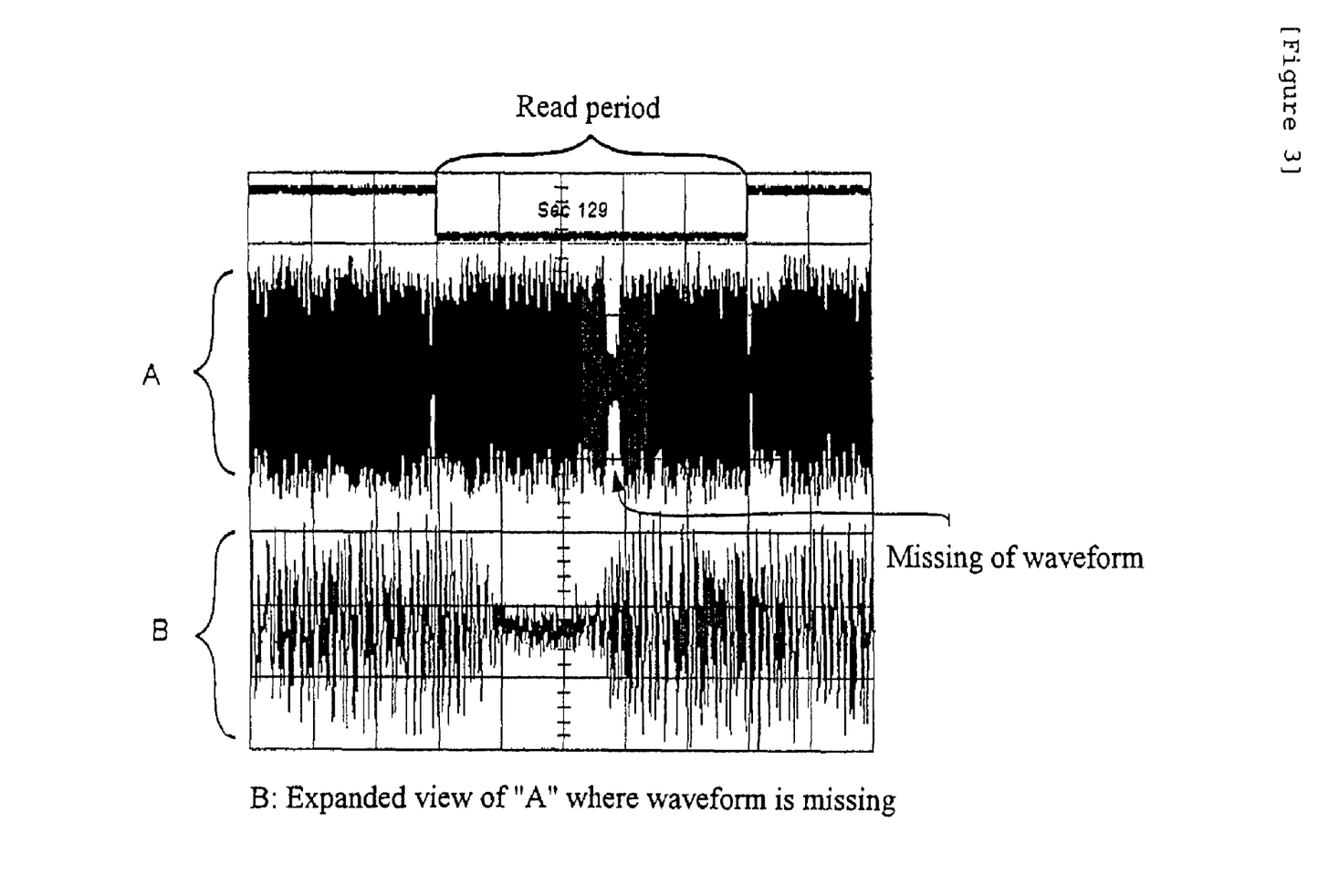
FIG. 3 is a graph denoting a read waveform to appear when a scratch occurs on the magnetic disk.

FIG. 3 shows a read waveform that appears when a read error is caused by a scratch on the magnetic disk 2. When an attempt is done to read such a defect on the magnetic disk 2, the read waveform is lost at that spot. As a result, an unstable values are read from the defective spot. The data stored on such a defective spot, because of noises or the like, has a different value at each time of reading. Thus, a number of reading over the one sector produce different values only at this sector, and therfore, the error spot in the sector can be identified. And, according to this information, the erasure correction can be done to correct more errors.

Figure 4:
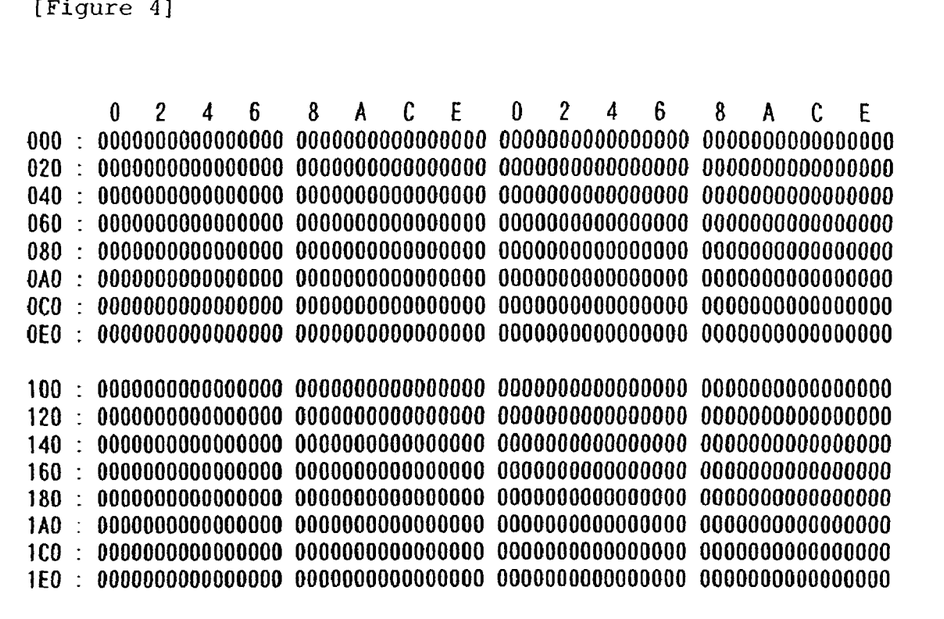
FIG. 4 is a sector of user data written on the magnetic disk in the embodiment of the present invention.

For example, assume now that 0 is set for every byte in a sector of user data written by the head 4 as shown in FIG. 4. In this case, the data length in one sector is assumed to be 512 bytes. The ECC byte is not mentioned here.

Figure 5:
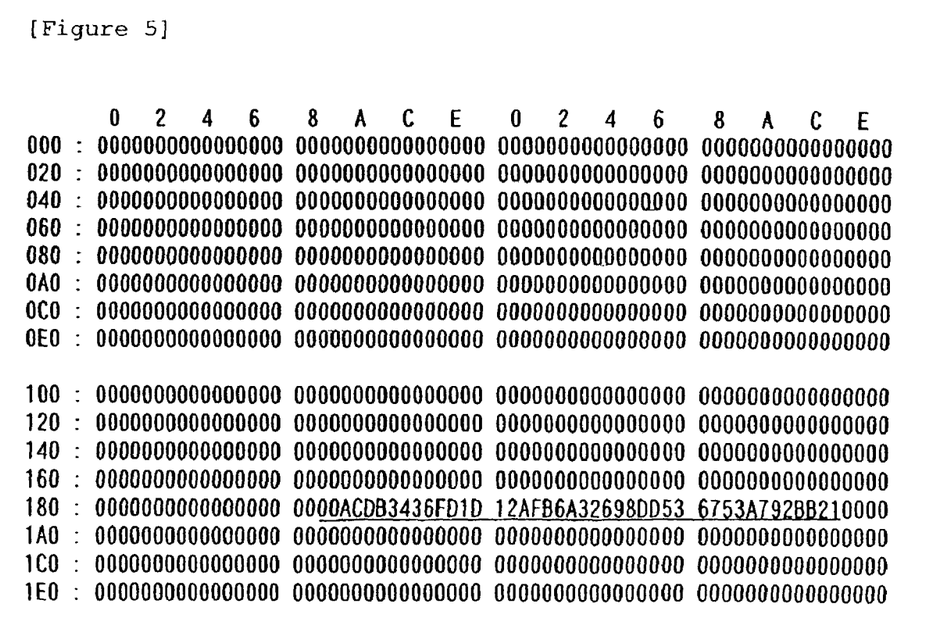
FIG. 5 is the first read data in the embodiment of the present invention.

After the above described user data is written on the magnetic disk 2, the head 4 reads the user data (the first read data), which is as shown in FIG. 5. Specifically, the data values of the underlined location are not "0's," although "0's" are written there. This means that only the data in these 20 bytes is damaged. In other words, errors have occurred there. This first read data is decided as error data by the ECC circuit 18. Then, this first read data and the read ECC byte are stored in the memory 16 according to the instruction from the memory manager logic 19.

Figure 6:
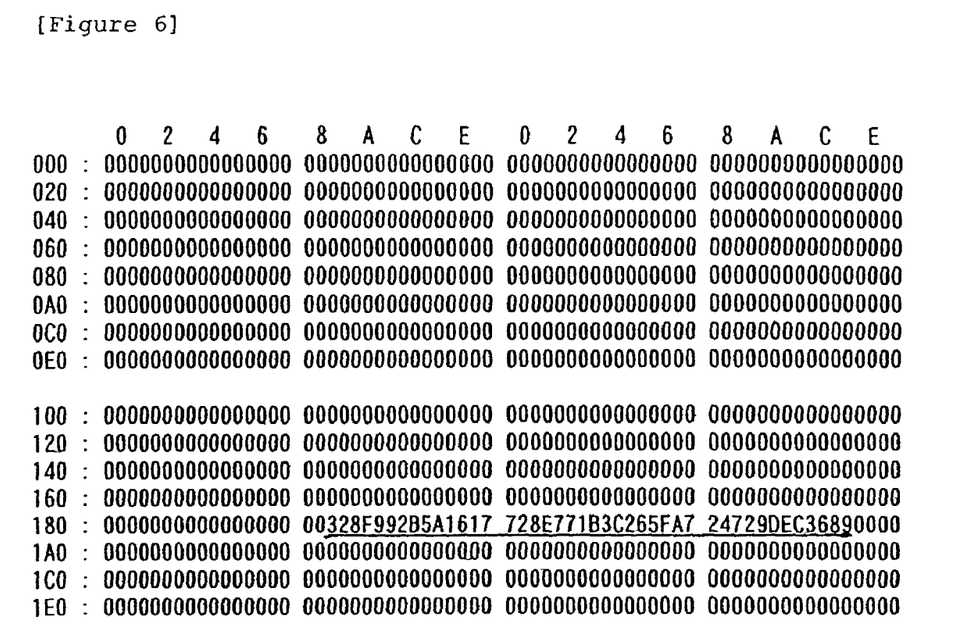
FIG. 6 is the second read data in the embodiment of the present invention.

Because an error occurrence is decided for the first read data, data in the same sector is to be read secondly. This second reading is instructed by the drive controller logic 17. FIG. 6 shows the user data read by the second read operation. This second read data and the read ECC byte are stored in the sector buffer 15. In the second read data, the underlined 23 bytes of data is decided as error data.

The data comparing logic 20 compares the first read data and the read ECC byte stored in the memory 16 with the second read data and the read ECC byte stored in the sector buffer 15. Hereinafter, it is premised in the following description that no error has occurred in the ECC byte. At first, a comparison is made between FIGS. 5 and 6. The data values in 189h to 19Dh of the first read data are "00ACDB3436FD1D 12AFB6A32698DD53 6753A792BB21" while those of the second read data are "328F992B5A1617 728E771B3C265FA7 24729DEC3689." This means that the data in the range of 189h to 19Dh does not match between the first read data and second read data, that is, they are different from each other. This data in the range of 189h to 19Dh is decided as an error portion, which is then stored in the memory 16. Then, erasure correction is done for the data in that portion, thereby generating true data. In the case where the erasure correction cannot correct the error, an error recovery operation is performed for the data in that portion.

While the above described comparison is done only for user data, the comparison may also be done for an ECC byte with error occurrence to identify the error-occurred portion and correct the error.

Next, a description will be made for a method that identifies true data by reading data from the same sector a number of times in the above embodiment. This method applies a majority decision for the data read a number of times.

Figure 7:
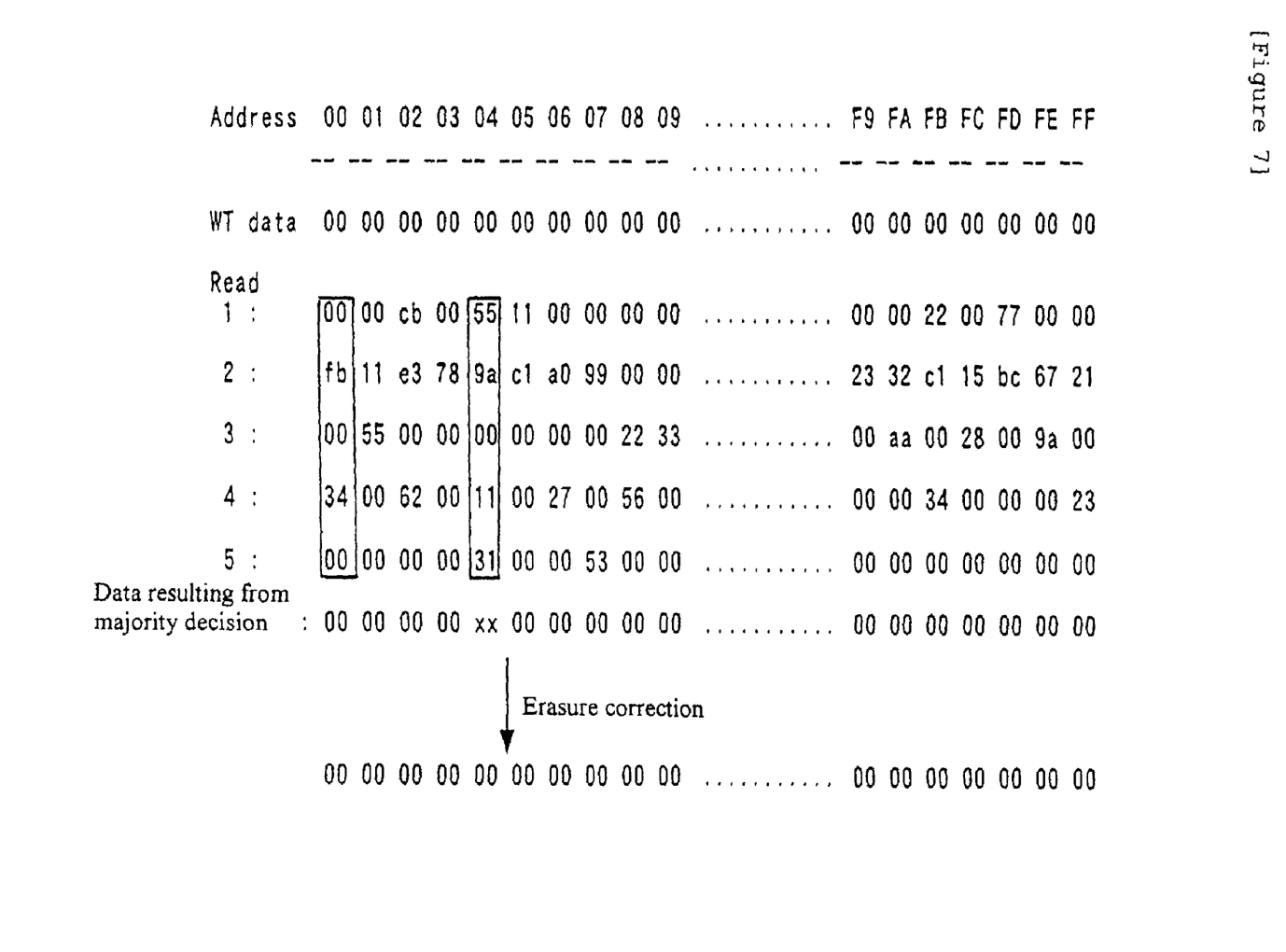
FIG. 7 is a chart for comparing first to fifth read data with the data resulting from a majority decision in the embodiment of the present invention.
Figure 8:
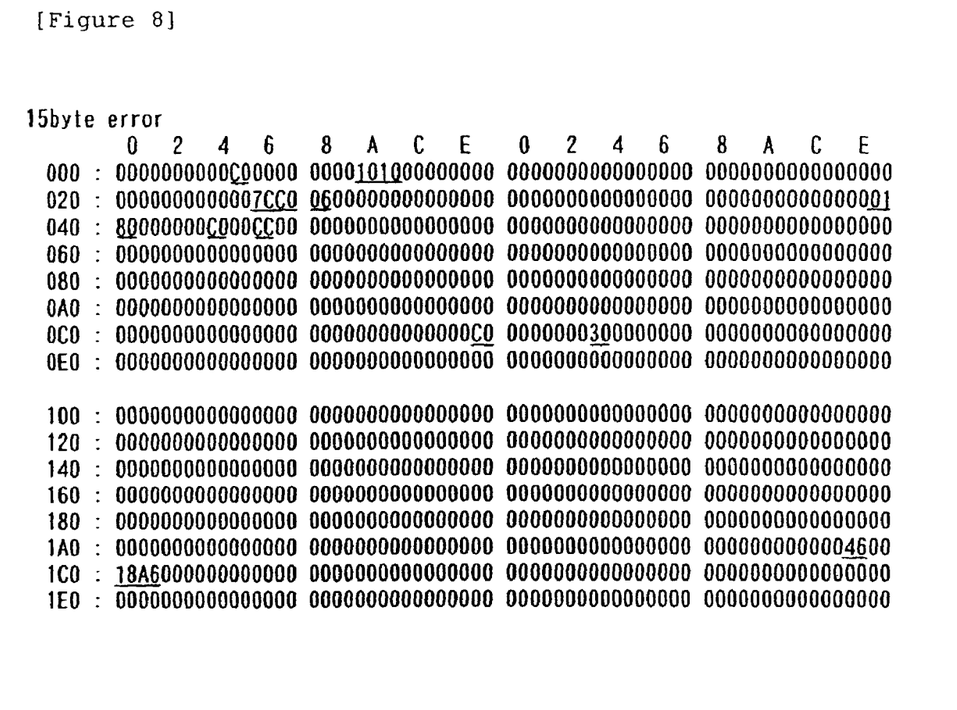
FIG. 8 is the first read data in the embodiment of the present invention.
Figure 9:
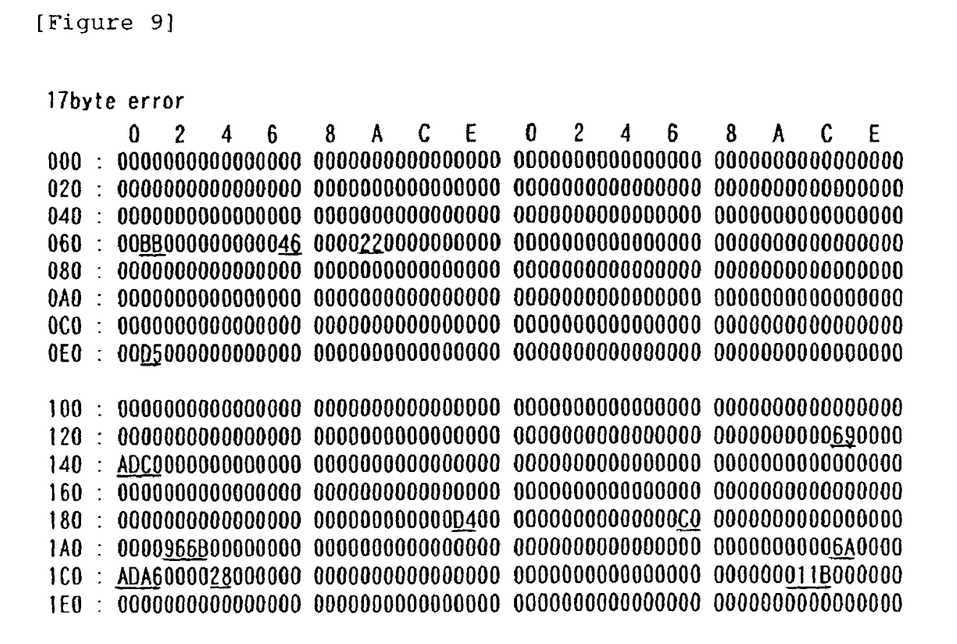
FIG. 9 is the second read data in the embodiment of the present invention.
Figure 10:
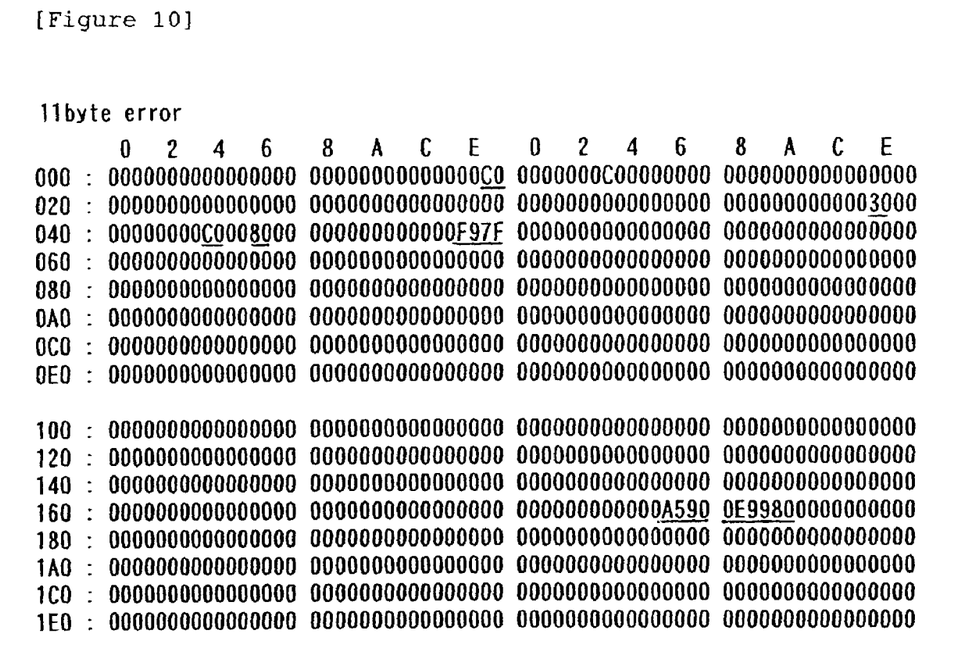
FIG. 10 is the third read data in the embodiment of the present invention.
Figure 11:
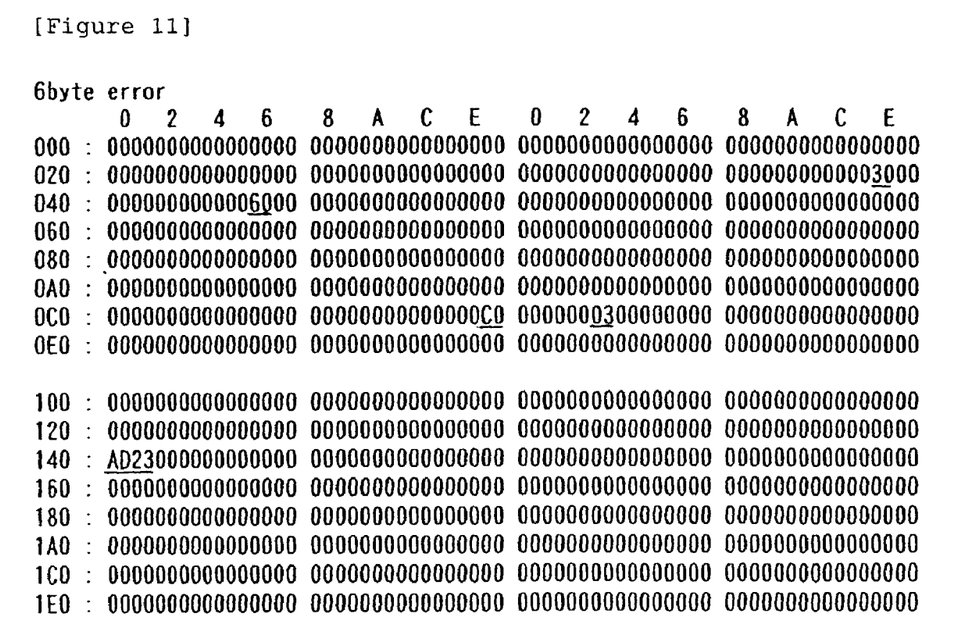
FIG. 11 is the fourth read data in the embodiment of the present invention.
Figure 12:
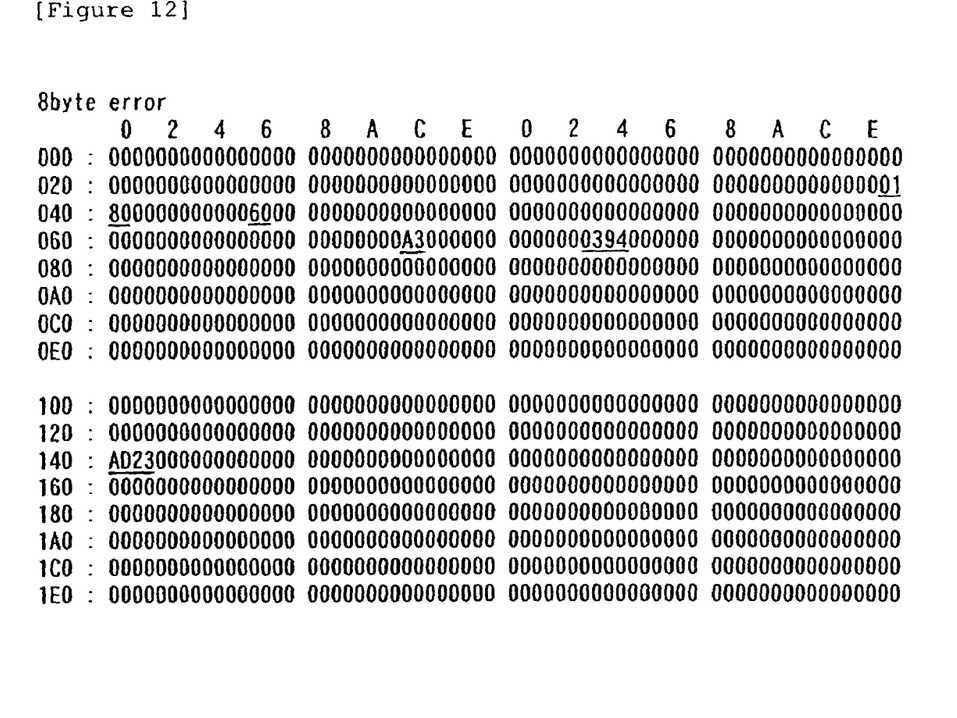
FIG. 12 is the fifth read data in the embodiment of the present invention.

For convenience', sake, it is premised here that 0's are written in every byte in a target sector as shown in the WT data in FIG. 7. It is also premised in this example that the sector errors are all uncorrectable.

Assume now that both user data and parity are read as shown in Read 1 in FIG. 7 in the first read operation after the ECC circuit 18 decides a sector of error as uncorrectable. This data is stored in the sector buffer 15 by the memory manager logic 19 via the driver control logic 17 and the ECC circuit 18.

In the case where the number of errors detected in and after the second read operation is under the number of correctable errors, the read operation is decided as normal. In order to describe the effect of the present invention, it is premised here that the number of errors to occur in each of the subsequent read operations is always over the number of errors correctable by the ECC circuit 18. It is also premised that the second read operation is successful as shown in Read 2 in FIG. 7 and the third to fifth read operations are successful as shown in Read 3 to 5 in FIG. 7.

In the data read by the five read operations from the address 00h, the data value becomes "00"h three times, and "fb"h and "34"h once respectively. In this case, "00" is adopted as a result of a majority decision, thereby it is decided that "00"h is written in the address 00h in this sector. This value is thus stored in the sector buffer 15 as the data resulting from the majority decision. The similar operations are done for every data and every parity, and the result is stored in the sector buffer 15. As for such an address as 04h from which the same value is never read, the value, for example, of the first read data may be selected. And, the location corresponding to the address is decided as an erasure location. While the above operations are all done by the data comparing logic 20, they may be done by a hardware component or software.

Next, a syndrome is calculated again from the data resulting from the majority decision as follows. After making a majority decision, the data transfer logic 21 reads the data resulting from the majority decision from the sector buffer 15, then transfers the read data to the syndrome generator 182 located in the ECC circuit 18. The syndrome generator 182 then generates a syndrome for the data resulting from the majority decision.

When the clock differs between the syndrome generator 182 and the majority decided data transfer logic 21, the clocks are synchronized in the data transfer logic 21, then the data is transferred to the syndrome generator 182. Such a syndrome may also be generated by software.

When the syndrome is generated such way, erasure correction is done with use of the decoder 181 located in the ECC circuit 18 and the erasure location obtained when data is decided after a majority decision. The data, after the erasure correction is applied thereto, is output to the host computer 200.

As described above, according to this embodiment, a majority decision is made for the data read by a number of times to obtain information of an erasure location at an accuracy higher than that of any of the conventional methods. The data is then corrected to true data without use of any error correction code. It is thus possible to read data even under large random noises, which has been impossible conventionally.

For example, this method is effective even for the data that is not always read correctly from around a boundary between an error-occurred portion and a normal portion where data is damaged at a length of several tens of bytes like a scratch, thereby the number of errors is reduced. The probability of successful decoding by the error correction code can thus be improved.

Figure 13:
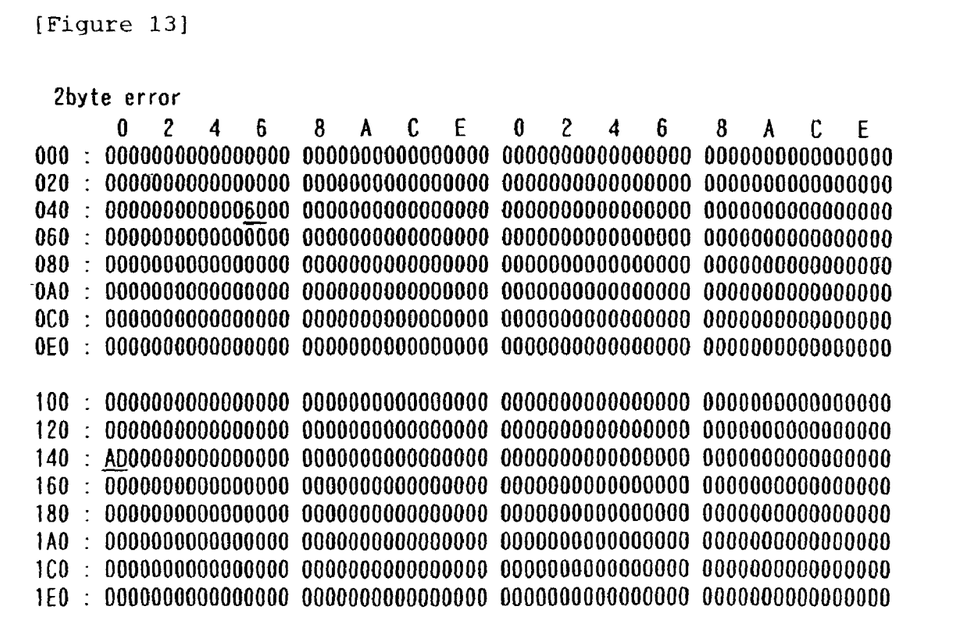
FIG. 13 is true data identified by a majority decision in the embodiment of the present invention.

FIGS. 8 through 13 show specific examples for how true data is identified by a majority decision. FIGS. 8 through 12 show first to fifth read data. In each read operation, decided error-occurred locations are underlined. The number of errors in each read operation is 6 to 16 bytes. When majority decision is adopted, however, the number of errors is reduced to 2 bytes as shown in FIG. 13.

Figure 14:
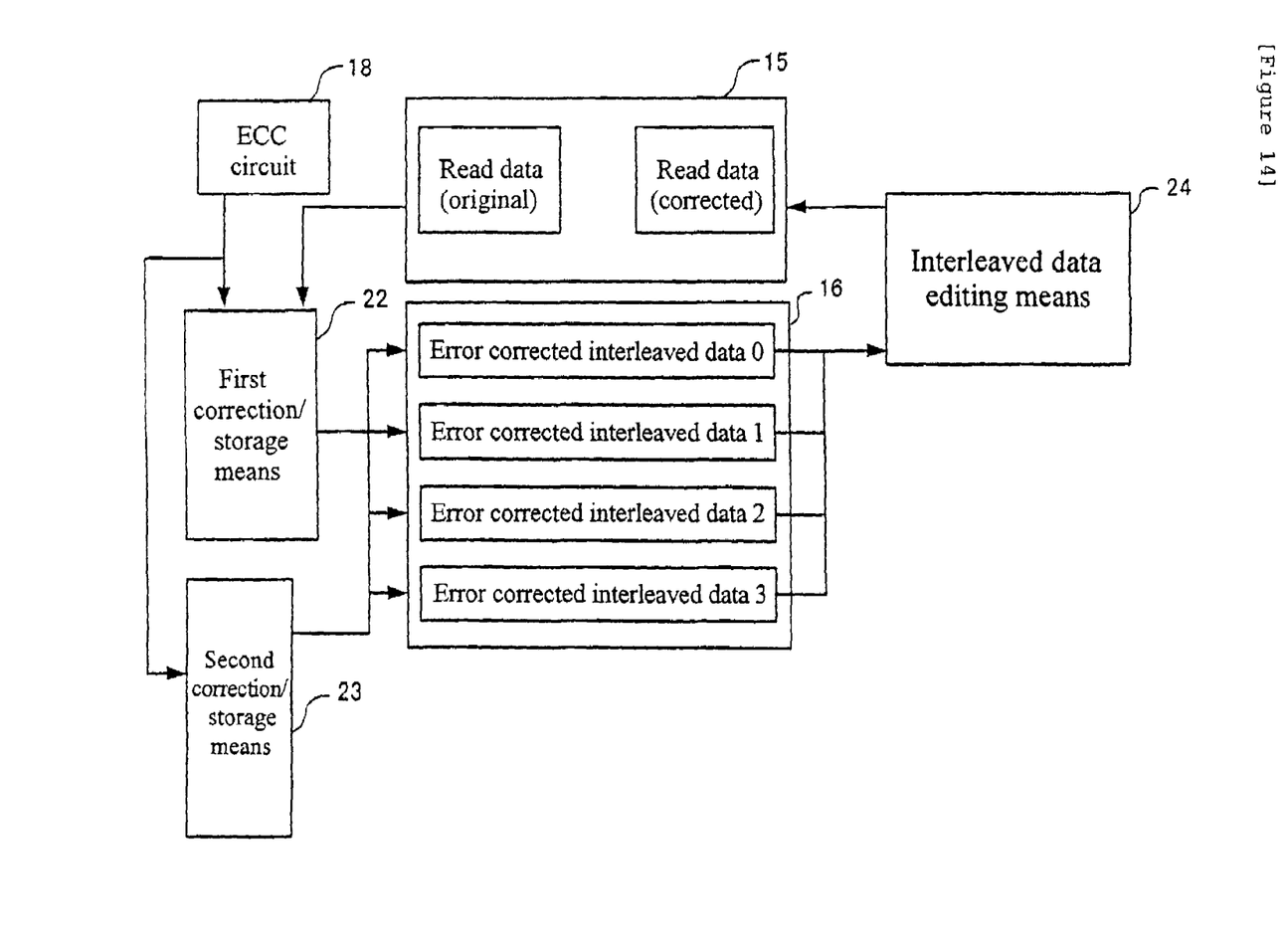
FIG. 14 is a functional block diagram of error correction performed for each interleave section in the embodiment of the present invention.

Next, a description will be made for a case in which error correction is done for each interleave section with reference to FIG. 14. FIG. 14 shows a functional block diagram for error correction in such the case.

The ECC circuit 18 decodes each interleave section. Consequently, whether or not an error is correctable is decided. When the error is correctable, the error location and the error value in the interleave section are held.

In FIG. 14, the first correction/storage means 22 has a function for correcting an interleave section decided as error correctable and storing the corrected data in the sector buffer 15. The second correction/storage means 23 has a function for executing an error recovery operation for each error-detected interleave section decided as uncorrectable, thereby completing the error correction and storing the recovered data in the sector buffer 15.

The sector buffer 15 stores data ("original" in FIG. 14) read from a sector. The sector buffer 15 also stores corrected read data ("corrected" in FIG. 7)

The memory 16 stores error-corrected interleave sections. Because this embodiment employs 4-way interleaving method, the interleave section is stored in four (0 to 3) storing areas.

Interleave section editing means 24 generates sector data by combining some interleave sections stored in the memory 16. The generated data is stored in the sector buffer 15.

In the case where an error detected in any data read from a sector is decided as uncorrectable by the ECC circuit 18, it is decided whether or not the error is uncorrectable in every interleaved data at this time according to the information received from the ECC circuit 18.

The ECC circuit 18 decodes each interleave section with use of the decoder 181, so that whether or not the error is correctable is decided for each interleave section. When such an error is correctable, the ECC circuit 18 holds the error location and the error value in each interleave section.

After this, when an error-correctable interleaved data exists, the interleave section is stored in the memory 16. Then, the error is corrected according to the error location and the error value of the interleave section obtained from the ECC circuit 18, then the corrected data is stored in the memory 16. When errors in a number of interleave sections are correctable, this operation is done for each interleave section containing a correctable error.

After this, the ECC circuit 18 executes the conventional error recovery operation, etc. until the error in the interleave section decided as uncorrectable becomes a correctable one.

This conventional error recovery operation has been disabled unless data is read sector by sector in the error correctable state. In this embodiment, however, only the interleave section decided as error uncorrectable is aimed at and it is just decided for whether or not data is read from the interleave section in the error correctable state.

Therefore, when interleave section decided as error uncorrectable first, then decided as error correctable, the interleaved data is corrected and stored in the memory 16. When a plurality of interleave sections are decided as error uncorrectable, the error recovery operation is repeated until every interleave section goes into the error correctable state. In this case, it is not necessarily required to read those interleaved data simultaneously in the error-correctable state.

After all the interleave sections are corrected, the interleave section editing means 24 composes a sector of data from interleave section stored beforehand and stores the composed sector data in the sector buffer 15 again. Consequently, the method makes it possible to read data even from a sector decided as error correctable, which has been impossible conventionally.

Even in such a case, data authentication by the CRC syndrome is continued. This data authentication may be done for each corrected interleave section or it may be done by the interleave section editing means 24 after the subject data is edited as a sector of data. The method to be adopted at that time is decided by whether the CRC is generated for each interleave section or generated from a sector of data. This CRC is usually prepared for detection of corrected errors by the ECC circuit 18. The CRC is stored in each medium as part of the ECC byte. The ECC circuit 18 always uses a CRC syndrome to authenticate data at the time of error correction.

There are also some interleave sections decided by the ECC circuit 18 as those that require no error correction. The interleave section editing means 24 thus comes to take consideration for such an interleave section to generate a sector of data.

The above case is effective when, for example, the soft error rate is low and the random noise is significant. This is because the interleave section that might cause an uncorrectable error is varied at a high possibility between a read operation in a moment and the next read operation. However, because the soft error rate is low, a sector of data is never read in the error correctable state.

In this embodiment, interleave sections that are read successfully even once in the error correctable state is accumulated, thereby data is read even from a sector, in which data has never been recovered by any conventional method. In other words, this embodiment makes it possible to recover each interleaved data to recover data in each sector.

In the case of the present invention, when, for example, the decoder, etc. of the read/write channel 11 are affected by the value of an adjacent byte (symbol), data is not read from the magnetic disk 2. Instead, the data is decoded by the decoder, etc. located in the read/write channel 11 again with use of error correctable interleave section. Consequently, the present invention makes it possible to correct interleave sections whose detected errors have been uncorrectable. In such a case, the apparatus requires means for transfer of the data to the read/write channel 11 while error corrected interleave sections and error uncorrectable interleave sections are sorted into a sector of data.

As described above, according to the present invention, it is possible to improve the error correction probability, thereby it is possible to generate data to be read correctly.

What is claimed is:

1. A data storage apparatus, comprising:
   a head for writing/reading data in response to a write/read request received from a host;
   a storage medium on/from which data is written/read by said writing/reading processing executed by said head;
   storage means for temporarily storing pieces of read data read by said head a number of times from a predetermined area on said storage medium, individually; and
   comparing means for comparing each piece of read data with others.

2. The data storage apparatus according to claim 1 wherein said comparing means decides matching/unmatching among data values in corresponding sections of said pieces of read data stored individually.

3. The data storage apparatus according to claim 2 wherein said apparatus further includes error correcting means that makes error correction for each data value in a section decided as unmatching by said comparing means.

4. The data storage apparatus according to claim 1 wherein said comparing means makes a majority decision for the data values in corresponding sections of said read pieces of data stored individually.

5. The data storage according to claim 4 wherein said comparing means regards the most frequently read value in said majority decision as a true data value in said section and generates a piece of read data by combining those true data values; and
   wherein said error correcting means makes error correction for the piece of read data generated by said combination.

6. A read data processor, comprising:
   first deciding means that decides whether or not a data error occurs in a first piece of data read from each sector having a predetermined capacity;

reread instructing means that reads data again from said sector that contains said first piece of data decided as error data by said first deciding means, to obtain a second piece of data;

second deciding means that decides whether or not the values of said first and second piece of data in corresponding positions are different from each other; and error correcting means that makes error correction for said first and second piece of data when said values are decided as different by said second deciding means.

7. The read data processor according to claim 6 wherein said second deciding means, when said second piece of data is decided as error data by said first deciding means, decides whether or not said values of said first and second pieces of data in corresponding positions are identical.

8. A read data processor that processes pieces of read data read from a storage medium having a track formed thereon, for each of a plurality of sectors, said track consisting of the plurality of sectors, said-apparatus comprising:

storage means that temporarily stores said n pieces of read data read n times (n; natural number) from a predetermined sector;

identifying means that identifies the most frequently read value among said n pieces of read data read from each location in said sector; and read data composing means that composes a generated piece of data generated by said most frequently read values identified for said locations by said identifying means.

9. The read data processor according to claim 8 wherein, when it is impossible to identify the most frequently read value among said n pieces of said read data read from each location in said sector, the value of said piece of read data read latest in a predetermined number of readings is identified as a value used to compose said generated piece of data in said location.

10. The read data processor according to claim 9 wherein said apparatus further includes error correcting means that makes error correction for said generated piece of data composed by said read data composing means.

11. A data storage apparatus, comprising:

a head that writes/reads data in response to a write/read request received from a host;

a storage medium on/from which data is written/read by said head;

first storage means that temporarily stores a piece of read data read from said storage medium by said head with the piece of read data divided and stored in predetermined units according to a predetermined rule; and deciding means that decides whether or not an error occurs in said piece of read data divided and stored in each predetermined unit.

12. The data storage apparatus according to claim 11:

wherein said apparatus further includes error correcting means that makes error correction for the read data divisions in said predetermined units, respectively, when said piece of read data is decided as error data; and wherein, after the error correction executed by said error correcting means, said deciding means decides, with respect to said read data decided as error data, whether or not error correction has been allowed for each read data division stored in the predetermined unit.

13. The data storage apparatus according to claim 12 wherein said apparatus further includes second storage means that temporarily stores said piece of read data in said predetermined unit, said data being decided as error correctable by said deciding means and corrected by said error correcting means.

14. The data storage apparatus according to claim 13 wherein said apparatus applies a predetermined process for allowing error correction to said predetermined unit having said piece of read data decided as error correctable by said deciding means.

15. The data storage apparatus according to claim 14 wherein said error correcting means applies an error correcting process to said predetermined unit over which a predetermined process for error correction is already applied; and wherein said second storage means stores said predetermined unit of data to which said error correcting process is applied.

16. The data storage apparatus according to claim 15 wherein said apparatus further includes editing means that generates said predetermined unit of data to be output on said host according to said piece of read data decided as error correctable by said deciding means and corrected by said error correcting means and said piece of read data decided as error uncorrectable by said deciding means and corrected by said error correcting means, both of said piece of data being read from said second storage means.

17. A read data processor that divides a piece of data read from each sector on a storage medium into a number of interleave sections and processes said piece of data, said apparatus, comprising:

storage means that stores each interleave section of said piece of data;

error deciding means that decides whether or not an error occurs in each interleave section; and error correcting means that applies error correction to each interleave section;

wherein a piece of read data to be output to external is composed by a combination of interleave sections decided as error-occurred interleave sections by said error deciding means and corrected by said error correcting means.

18. A read data processing method, comprising the steps of:

reading a piece of user data from each sector on a storage medium;

deciding whether or not an error occurs in said piece of user data;

reading said piece of user data once or twice or more again from said sector that contains said error-detected piece of user data; and making a comparison between the piece of user data initially read and the piece of user data next read with respect to their data values read from the same location.

19. The read data processing method according to claim 18 wherein a comparison is made among said data values to decide whether or not the data value in said location is varied each time it is read.

20. The read data processing method according to claim 19 wherein, when said data value is varied in said comparison, it is decided that an error has occurred in said data.

21. The read data processing method according to claim 19 wherein said comparison is made among data values to assume the most frequently matched data value as a true data value.

22. A read data processing method, comprising the steps of:

reading a piece of user data from each sector on a storage medium;

dividing said read user data into a number of interleave sections;

deciding whether or not an error occurrs in each of said interleave sections;

applying a first error correcting process to each interleave section decided as error data; and applying a second error correcting process to each interleave section whose error is not corrected by said first error correcting process, said second error correcting processing being different from said first error correcting process.

23. The read data processing method according to claim 22 wherein a sector of read data to be output is composed by a combination of one or more interleave sections such as an interleave sections decided as containing no error, an interleave sections whose error is corrected by said first error correcting process, and interleave sections whose error is corrected by said second error correcting process.

* * * * *